(12) United States Patent
Umetsu et al.

(10) Patent No.: US 12,077,053 B2
(45) Date of Patent: Sep. 3, 2024

(54) POWERTRAIN SYSTEM FOR ELECTRIC AUTOMOBILE

(71) Applicant: Mazda Motor Corporation, Hiroshima (JP)

(72) Inventors: Daisuke Umetsu, Aki-gun (JP); Shinya Morishita, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 534 days.

(21) Appl. No.: 17/356,202

(22) Filed: Jun. 23, 2021

(65) Prior Publication Data
US 2022/0001751 A1 Jan. 6, 2022

(30) Foreign Application Priority Data

Jul. 1, 2020 (JP) .................. 2020-113863

(51) Int. Cl.
*B60L 15/20* (2006.01)
*B60K 17/00* (2006.01)
*B60K 26/02* (2006.01)
*B62D 1/04* (2006.01)
*B60L 7/10* (2006.01)

(52) U.S. Cl.
CPC .............. *B60L 15/20* (2013.01); *B60K 17/00* (2013.01); *B60K 26/02* (2013.01); *B62D 1/046* (2013.01); *B60L 7/10* (2013.01); *B60L 2240/423* (2013.01); *B60L 2250/28* (2013.01)

(58) Field of Classification Search
CPC ...... B60L 15/20; B60L 7/10; B60L 2240/423; B60L 2250/28; B60L 2240/12; B60K 17/00; B60K 26/02; B60K 17/12; B62D 1/046; Y02T 10/64; Y02T 10/72
See application file for complete search history.

(56) References Cited

U.S. PATENT DOCUMENTS

| | | | |
|---|---|---|---|
| 2008/0215201 A1* | 9/2008 | Shunsuke | B60K 6/365 |
| 2017/0247027 A1* | 8/2017 | Bernard | B60K 6/387 |
| 2019/0241075 A1* | 8/2019 | Takahisa | B60L 15/10 |

FOREIGN PATENT DOCUMENTS

| | | | |
|---|---|---|---|
| CN | 107128300 A | 9/2017 | |
| JP | 2005168283 A | 6/2005 | |
| JP | 2015149876 A * | 8/2015 | ............. Y02T 10/72 |

* cited by examiner

*Primary Examiner* — Anne Marie Antonucci
*Assistant Examiner* — Kirsten Jade M Santos
(74) *Attorney, Agent, or Firm* — Alleman Hall & Tuttle LLP

(57) ABSTRACT

A powertrain system for an electric automobile outputs a desired torque from a motor with an angle of an accelerator pedal that is easy for a driver to operate, regardless of traveling environments such as the road surface gradient and the wind direction. The powertrain system includes a paddle switch and a shifter that are mounted to be operable by a driver, and are electrically connected directly or indirectly to an electronic control unit (ECU). The ECU controls, based on a torque control map defining the relationship between an accelerator pedal opening and output torque of a motor in advance, the output torque of the motor according to the accelerator pedal opening, and changes, based on an operation on the paddle switch or the shifter, the torque control map to be used for controlling the output torque of the motor.

12 Claims, 8 Drawing Sheets

POWERTRAIN SYSTEM FOR ELECTRIC AUTOMOBILE

TECHNICAL FIELD

The present invention relates to a powertrain system for an electric automobile, and particularly to a powertrain system for an electric automobile that controls output torque of a motor according to an operation performed by a driver on an accelerator pedal.

BACKGROUND ART

This type of technology is disclosed, for example, in JP2005-168283A. In JP2005-168283A, a hybrid vehicle using an engine and an electric motor as motive power sources is disclosed. In general, in such a hybrid vehicle, output torque of the electric motor is controlled according to an operation on the accelerator pedal when traveling using motive power of the electric motor. In addition, the hybrid vehicle described in JP2005-168283A is provided with a mechanism for enabling a driver to select a shift lever position, and thereby arbitrarily set a deceleration of motive power source braking.

SUMMARY OF INVENTION

Problem to be Solved by the Invention

An electric automobile that uses a motor as a primary motive power source, instead of an engine, often adopts a configuration that transmits output torque of the motor to drive wheels with a single reduction ratio. In this case, the output torque of the motor can also be controlled according to an accelerator pedal opening. For example, the relationship between the accelerator pedal opening and the output torque of the motor can be set such that a constant vehicle speed can be maintained with a pedal angle that causes a small muscle burden on a right foot depressing the accelerator pedal, during normal traveling on flat ground.

However, in an electric automobile in which the reduction ratio between the motor and the drive wheels is fixed, if traveling resistance changes due to a road surface gradient, a headwind, etc., the constant vehicle speed cannot be maintained unless the output torque of the motor is changed by adjusting the accelerator pedal opening. Therefore, even if the constant vehicle speed can be maintained with a pedal angle that causes a small muscle burden on the right foot during normal traveling on flat ground, when an attempt is made to maintain a constant vehicle speed at the time of occurrence of external turbulence such as the road surface gradient, the accelerator pedal angle comes out of an angle range within which the muscle burden on the right foot is small, resulting in impairment of comfort and ease of operation.

The present invention has been made to solve the above-mentioned problem, and an object of the invention is to provide a powertrain system for an electric automobile that can output a desired torque from a motor with an angle of an accelerator pedal that is easy for a driver to operate, regardless of traveling environments such as the road surface gradient and the wind direction.

Means for Solving the Problem

In order to achieve the above object, disclosed herein is a powertrain system for an electric automobile, including: a motor; a motive power transmission mechanism that transmits an output torque of the motor to a drive wheel with a single reduction ratio; an accelerator pedal opening sensor that detects an accelerator pedal opening; a controller electrically connected directly or indirectly to the motor and the accelerator pedal opening sensor; and an operation switch that is mounted in such a location as to be operable by a driver while driving, and is electrically connected directly or indirectly to the controller. The controller includes memory for storing a program, and a processor for executing the program. The processor is configured to control, based on control information defining a relationship between the accelerator pedal opening and the output torque of the motor in advance, the output torque of the motor according to the accelerator pedal opening, and to change, based on an operation on the operation switch, the control information to be used for controlling the output torque of the motor.

According to this configuration, even in the electric automobile in which the reduction ratio between the motor and the drive wheels is fixed, the torque to be output from the motor can be changed, without adjusting the accelerator pedal opening, by the driver by operating the operation switch and changing the control information to be used for controlling the output torque of the motor. This makes it possible to output the desired torque from the motor with an angle of the accelerator pedal that is easy for the driver to operate, regardless of traveling environments such as the road surface gradient and the wind direction.

In one aspect, preferably the operation switch is mounted on a steering wheel of the electric automobile.

According to this configuration, the driver can easily perform the operation for changing the control information to be used for controlling the output torque of the motor while traveling.

In one aspect, preferably the processor is configured to control, based on control information defining a relationship between the accelerator pedal opening and regenerative torque of the motor in advance, the regenerative torque of the motor according to the accelerator pedal opening, and change, based on an operation on the operation switch, the control information to be used for controlling the regenerative torque of the motor.

According to this configuration, even in the electric automobile in which the reduction ratio between the motor and the drive wheels is fixed, the regenerative torque of the motor can be changed, without adjusting the accelerator pedal opening, by the driver by operating the operation switch and changing the control information to be used for controlling the regenerative torque of the motor. This makes it possible to generate the desired regenerative torque by the motor with an angle of the accelerator pedal that is easy for the driver to operate, regardless of traveling environments such as the road surface gradient and the wind direction.

In one aspect, preferably the operation switch is configured to be capable of repeatedly receiving a first operation and a second operation, and the control information to be used for controlling the output torque of the motor is set such that the output torque of the motor according to the same accelerator pedal opening increases every time the first operation on the operation switch is received, and that the output torque of the motor according to the same accelerator pedal opening decreases every time the second operation on the operation switch is received.

According to this configuration, it is possible to change stepwise the control information to be used for controlling the output torque of the motor by the driver by repeatedly operating the operation switch. This makes it possible to change stepwise the torque to be output from the motor without adjusting the accelerator pedal opening, and to output desired torque from the motor with an angle of the accelerator pedal that is easier for the driver to operate.

In another aspect, the operation switch is configured to be capable of receiving different operating strokes, and the control information to be used for controlling the output torque of the motor is set such that the output torque of the motor according to the same accelerator pedal opening increases or decreases with an increase in operating stroke of the operation switch.

The control information to be used for controlling the output torque of the motor can be changed stepwise according to the stroke of operating the operation switch by the driver. This makes it possible to change stepwise the torque to be output from the motor, without adjusting the accelerator pedal opening, and to output desired torque from the motor with an angle of the accelerator pedal that is easier for the driver to operate.

Advantageous Effect of Invention

According to the powertrain system for an electric automobile of the present invention, it is possible to output the desired torque from the motor with an angle of the accelerator pedal that is easy for the driver to operate, regardless of traveling environments such as the road surface gradient and the wind direction.

MODE FOR CARRYING OUT THE INVENTION

Figure 1:
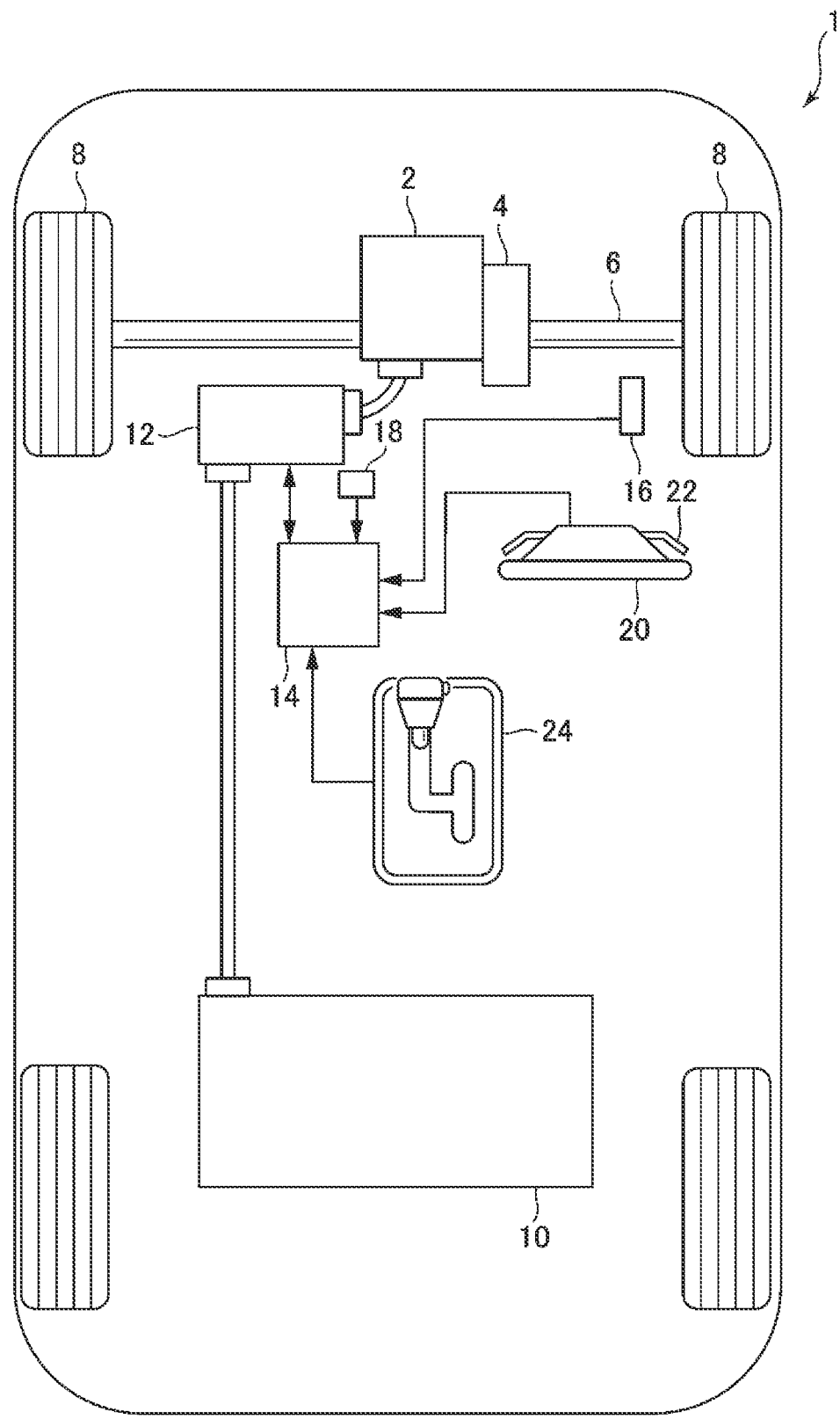
FIG. 1 is a plan view showing a schematic configuration of a vehicle to which a powertrain system for an electric automobile according to an embodiment of the present invention is applied.
Figure 2:
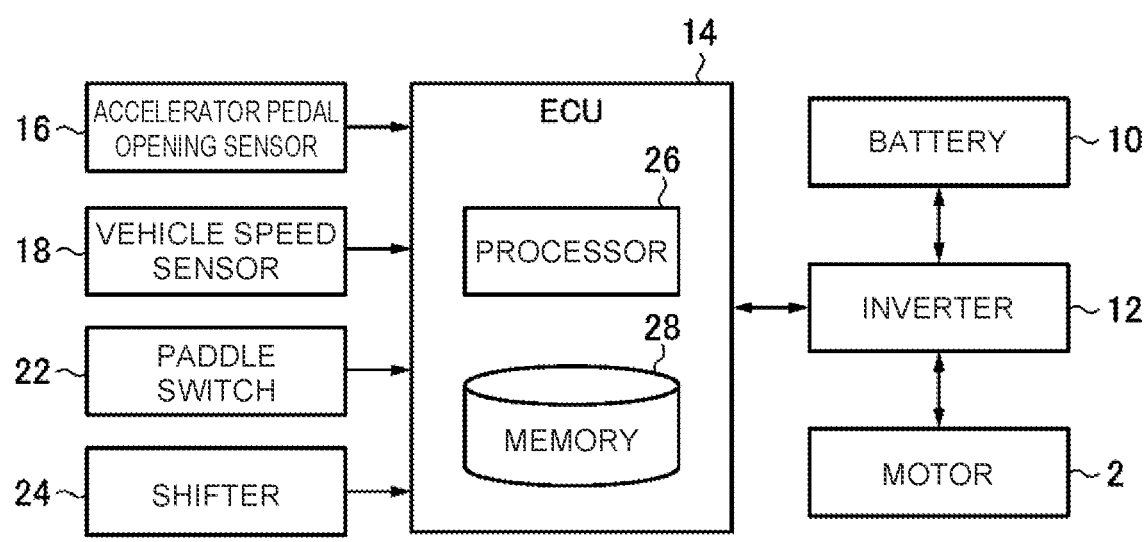
FIG. 2 is a block diagram showing a functional configuration of the powertrain system for an electric automobile according to the embodiment of the present invention.

Hereinafter, a powertrain system for an electric automobile according to an embodiment of the present invention will be described with reference to the attached drawings.
<System Configuration>
First, a configuration of the powertrain system for an electric automobile according to the present embodiment will be described with reference to FIG. 1 to FIG. 4. FIG. 1 is a plan view showing a schematic configuration of a vehicle to which the powertrain system for an electric automobile according to the present embodiment is applied, and FIG. 2 is a block diagram showing a functional configuration of the powertrain system for an electric automobile according to the present embodiment.

As shown in FIG. 1, an electric automobile 1 is an electric automobile having a motor 2 mounted as a motive power source. The motor 2 is mounted, for example, in a vehicle body front portion of the electric automobile 1. Torque output from the motor 2 is transmitted to a speed reducer 4. The speed reducer 4 outputs the output torque of the motor 2 to a pair of drive shafts 6 with a single reduction ratio. Consequently, a pair of drive wheels 8 (left and right front wheels in the example of FIG. 1) attached to vehicle-width-direction outer side ends of the drive shafts 6 are driven.

A battery 10 for supplying electric power to the motor 2 is mounted, for example, in a vehicle body rear portion of the electric automobile 1. In addition, an inverter 12 is disposed in the vicinity of the motor 2. The inverter 12 converts DC power supplied from the battery 10 into AC power and supplies the AC power to the motor 2, and converts regenerative electric power generated by the motor 2 into DC power and supplies the DC power to the battery 10 so as to charge the battery 10. The inverter 12 is electrically connected to an ECU 14 (Electronic Control Unit), and is capable of inputting and outputting control signals to and from the ECU 14.

The electric automobile 1 has an accelerator pedal opening sensor 16 that detects an accelerator pedal opening (corresponding to the amount of depressing an accelerator pedal by a driver), and a vehicle speed sensor 18 that detects a vehicle speed. These sensors are electrically connected directly or indirectly to the ECU 14, and output detection signals according to detection values to the ECU 14.

Furthermore, the electric automobile 1 includes a paddle switch 22 mounted on a steering wheel 20, and a shifter 24 mounted on a center console. The paddle switch 22 and the shifter 24 are disposed in such locations as to be operable by the driver while driving, and are electrically connected directly or indirectly to the ECU 14. When the paddle switch 22 and the shifter 24 are operated by the driver, the paddle switch 22 and the shifter 24 output operation signals according to the operations to the ECU 14.

In this electric automobile 1, the ECU 14 performs various kinds of control. In the present embodiment, the ECU 14 functions as a controller of the powertrain system for the electric automobile 1. That is, the ECU 14 controls the inverter 12 according to an operation performed by the driver on the accelerator pedal to supply electric power from the battery 10 to the motor 2 through the inverter 12 or supply regenerative electric power from the motor 2 to the battery 10, thereby realizing a desired output torque or regenerative torque according to the acceleration operation.

As shown in FIG. 2, the ECU 14 has a processor (i.e., a central processing unit (CPU)) 26, and memory 28 (such as ROM and RAM) for storing various programs that are interpreted and executed by the processor 26 (including a basic control program such as an OS (operating system), and application programs that are activated on the OS to realize specific functions), and various data.

Next, a configuration of the paddle switch 22 according to the present embodiment will be described with reference to FIG. 3. FIG. 3 is a view showing the steering wheel 20 including the paddle switches 22 according to the present embodiment, wherein FIG. 3A is a top view of the steering wheel 20, and FIG. 3B is a front view thereof.

Figure 3A:
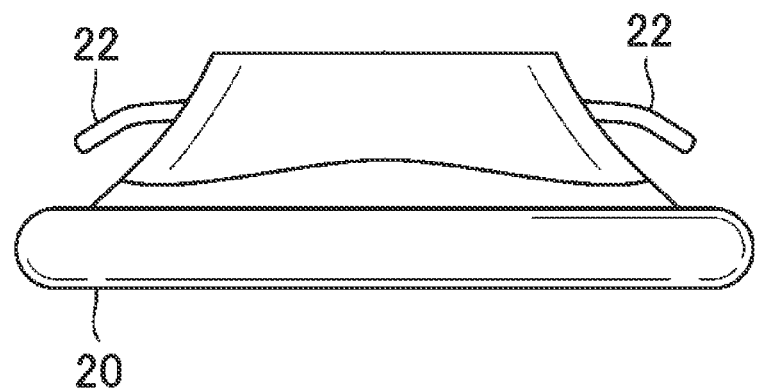
FIGS. 3A and 3B are a top view and a front view of a steering wheel including paddle switches according to the embodiment of the present invention.
Figure 3B:
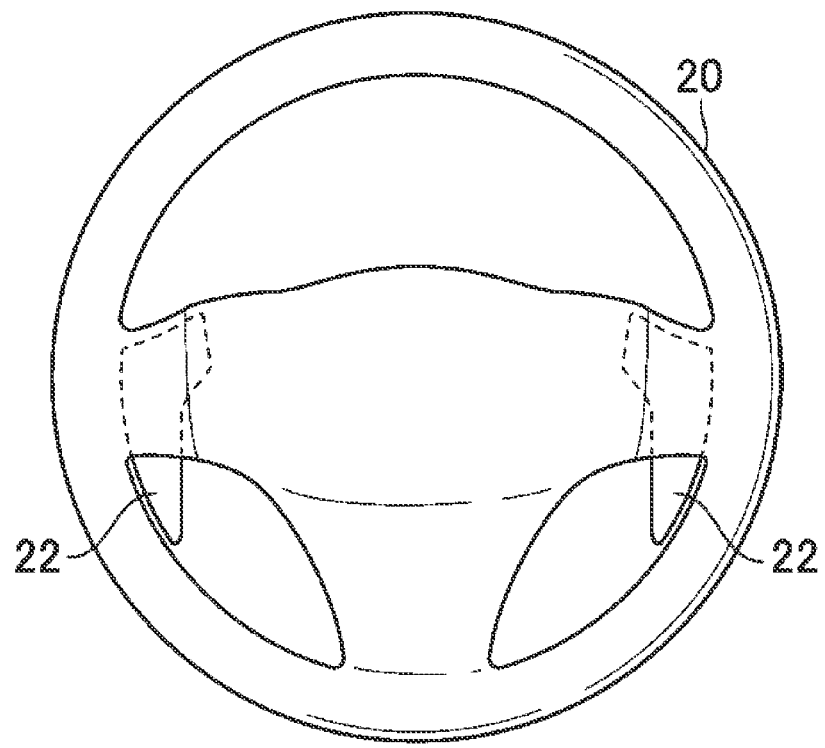

As shown in FIGS. 3A and 3B, a pair of paddle switches 22 are mounted on the back side (counter-occupant side) of the steering wheel 20. These paddle switches 22 are configured to allow the driver to pull each paddle switch 22 toward the driver (namely, the driver side) while putting the hands on the steering wheel 20. The paddle switches 22 are returnable switches. That is, when the driver lets go of the paddle switch 22 after the operation of pulling the paddle switch 22 toward the driver, the paddle switch 22 returns to the position before the operation (standard position). This makes it possible for the driver to repeatedly operate each paddle switch 22. In the present embodiment, an operation of pulling the right-side paddle switch 22, as seen from the driver seat side, toward the driver is called the "plus operation", and an operation of pulling the left-side paddle switch 22, as seen from the driver seat side, toward the driver is called the "minus operation". When one or both of the paddle switches 22 are operated, an operation signal according to the operated paddle switch 22 is output to the ECU 14.

Figure 4:
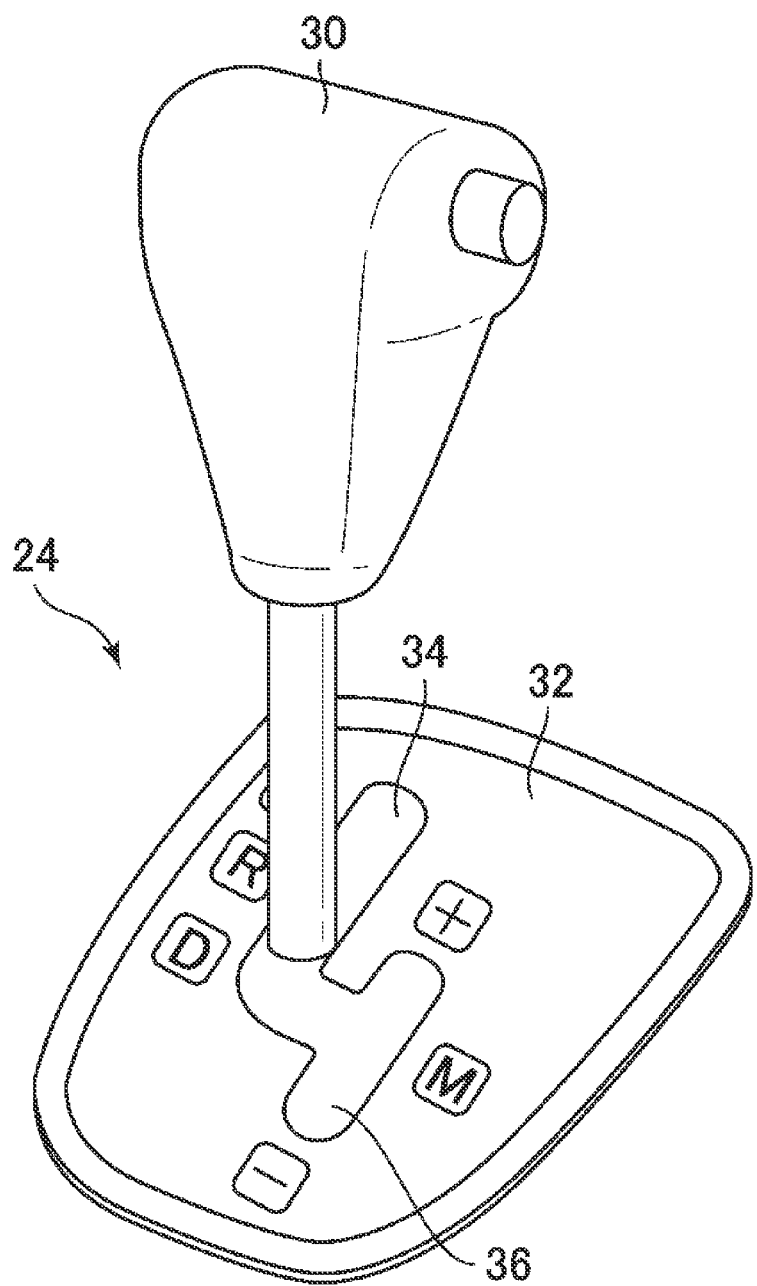
FIG. 4 is a perspective view of a shifter according to the embodiment of the present invention.

Next, a configuration of the shifter 24 according to the present embodiment will be described with reference to FIG. 4. FIG. 4 is a perspective view of the shifter 24 according to the present embodiment.

As shown in FIG. 4, the shifter 24 includes a shift lever 30 that is operated by the driver, and a gate panel 32 for guiding movement of the shift lever 30. The gate panel 32 is mounted, for example, on a top surface of the center console. Formed in the gate panel 32 are a main gate 34 extending in the front-rear direction of the electric automobile 1, and a sub gate 36 extending parallel to the main gate 34 on the right side (driver seat side) of the main gate 34. In the main gate 34, a P range, an R range, and a D range are arranged in series as shift positions from the front toward the rear of the electric automobile 1. The sub gate 36 is connected to the main gate 34 at the D range position, and an M range is located in the sub gate 36 at this connection position.

Each shift position is provided with a shift position sensor for detecting the position of the shift lever 30, and it is possible to detect in which of the P range, the R range, the D range, and the M range the shift lever 30 is positioned. Moreover, sensors for detecting shift lever operations toward the front and rear of the M range are provided in the front and rear of the M range. When the shift lever 30 is operated, the sensors output operation signals according to the position of the shift lever 30 to the ECU 14.

The sub gate 36 is a returnable gate with the M range as a standard position. That is, when the driver takes the hand off the shift lever 30 after performing an operation of moving the shift lever 30 toward the front (the + side in FIG. 4) (plus operation), or an operation of moving the shift lever 30 toward the rear (the − side in FIG. 4) (minus operation), the shift lever 30 returns to the standard position (the M range in FIG. 4). This makes it possible for the driver to repeatedly operate the shift lever 30.

<Relationship Between Accelerator Pedal Opening and Motor Torque>

Figure 5A:
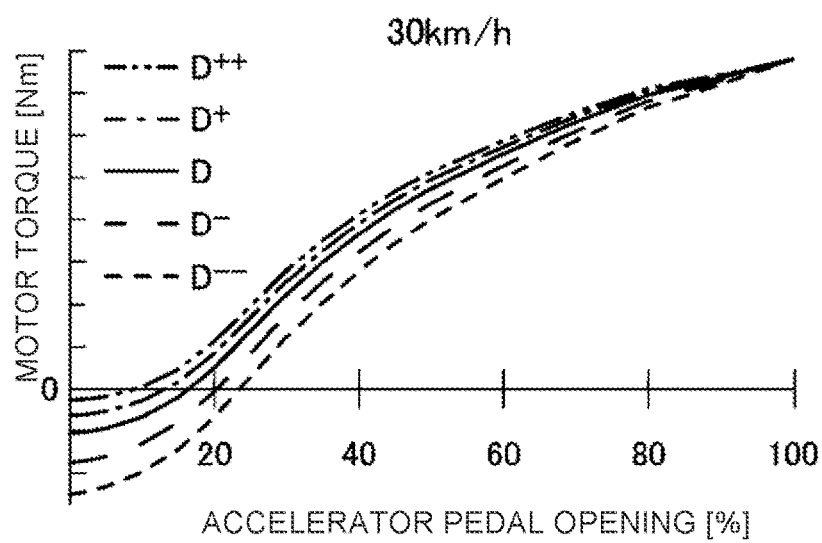
FIGS. 5A to 5C are views showing an example of a torque control map for each vehicle speed according to the embodiment of the present invention.
Figure 5B:
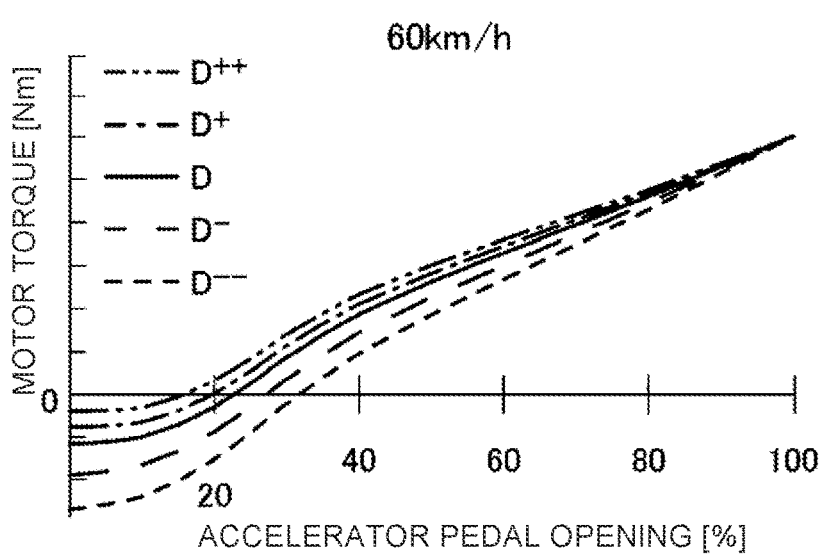
Figure 5C:
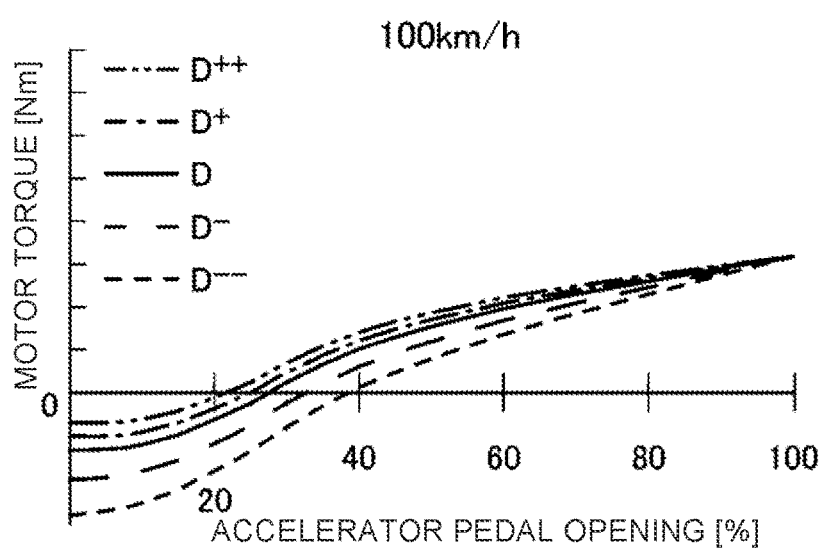

Next, the relationship between the accelerator pedal opening and the output torque and regenerative torque (motor torque) of the motor 2 will be described with reference to FIGS. 5A to 5C. FIGS. 5A to 5C are views showing an example of a torque control map for each vehicle speed according to the present embodiment. Specifically, FIG. 5A shows a torque control map to be used for a vehicle speed of 30 km/h, FIG. 5B shows a torque control map to be used for a vehicle speed of 60 km/h, and FIG. 5C shows a torque control map to be used for a vehicle speed of 100 km/h. In FIGS. 5A to 5C, the horizontal axis represents the accelerator pedal opening [%], and the vertical axis represents the motor torque [Nm]. When the motor torque on the vertical axis is a positive value, the motor torque indicates the output torque of the motor 2, whereas when the motor torque is a negative value, the motor torque indicates the regenerative torque of the motor 2.

In FIGS. 5A to 5C, the torque control maps to be used for 30 km/h, 60 km/h, and 100 km/h are merely shown as an example, and torque control maps to be used for various other vehicle speeds are actually prepared. These torque control maps are stored in the memory 28 of the ECU 14.

In the present embodiment, it is possible to change the relationship between the accelerator pedal opening and the output torque and regenerative torque of the motor 2 by operating the paddle switch 22 or the shift lever 30 positioned in the sub gate 36. Specifically, as shown in FIGS. 5A), 5B, and 5C, 5-step torque control maps D−−, D−, D, D+, D++ are prepared for each vehicle speed. In these torque control maps, the output torque of the motor 2 according to the same accelerator pedal opening increases in order of D−−, D−, D, D+, D++. The regenerative torque of the motor 2 according to the same accelerator pedal opening decreases in order of D−−, D−, D, D+, D++.

In any of the torque control maps, it is set such that the larger the accelerator pedal opening, the smaller the regenerative torque of the motor 2 and the larger the output torque. As the accelerator pedal opening approaches 100%, the output torque of the motor 2 in each of the torque control maps D−−, D−, D, D+, D++ is converged to the maximum output torque for each vehicle speed. It is also set such that the higher the vehicle speed, the larger the accelerator pedal opening at which the output torque becomes 0 (the regenerative torque also becomes 0). In the present embodiment, the accelerator pedal opening at which the output torque becomes 0 (the regenerative torque also becomes 0) is about 10 to 25% when the vehicle speed is 30 km/h, about 15 to 30% when the vehicle speed is 60 km/h, and about 20 to 40% when the vehicle speed is 100 km/h.

<Control Process>

Figure 6:
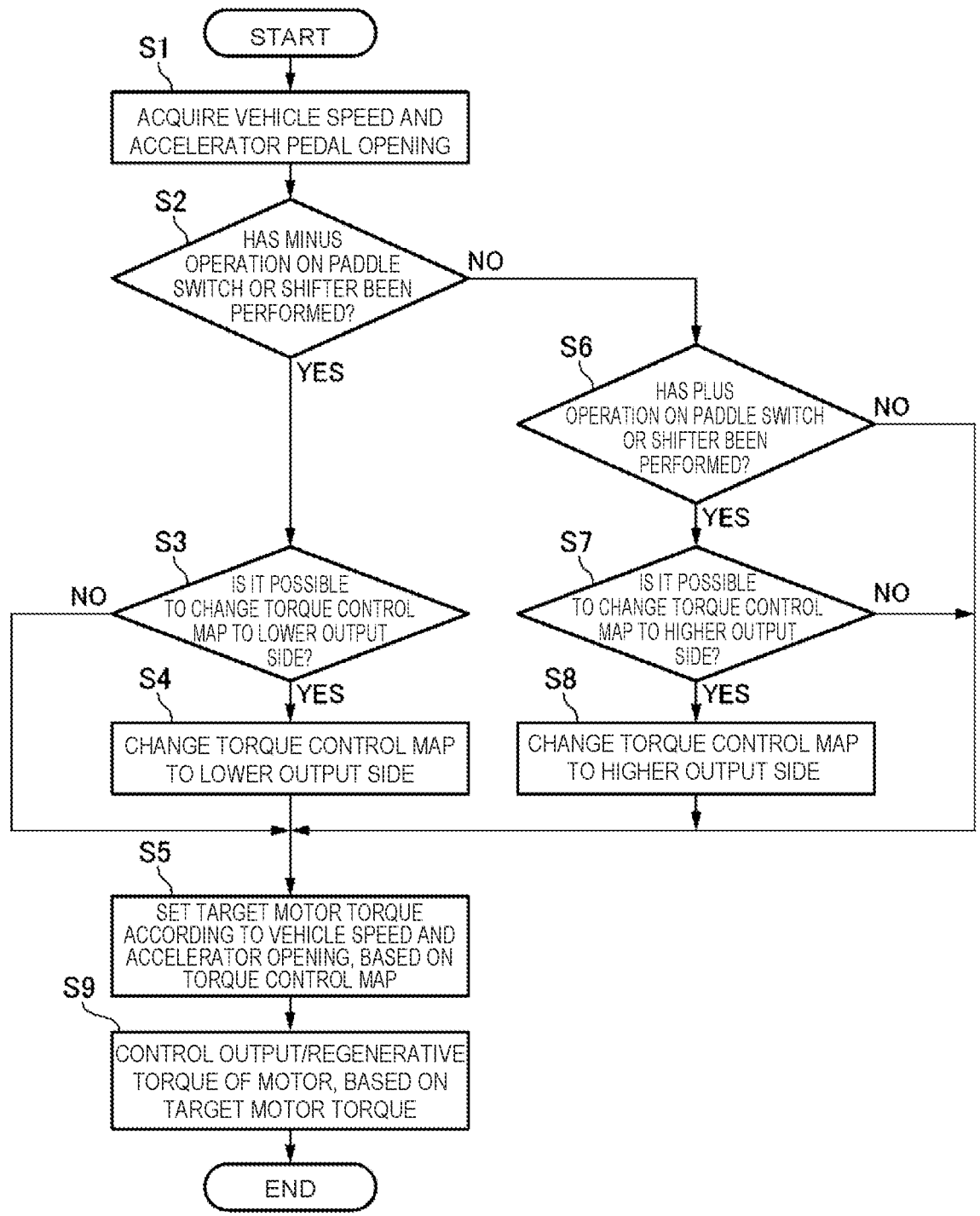
FIG. 6 is a flowchart showing a motor torque control process according to the embodiment of the present invention.

Next, a motor torque control process according to the present embodiment will be described with reference to FIG. 6. FIG. 6 is a flowchart showing the motor torque control process according to the present embodiment. This flow is started by the ECU 14 upon turning on the power source of the electric automobile 1, and is repeatedly executed at a predetermined cycle.

First, in step S1, the ECU 14 acquires the vehicle speed detected by the vehicle speed sensor 18, and the accelerator pedal opening detected by an accelerator opening sensor (more specifically, an accelerator pedal opening acquired by the ECU 14, based on a detection signal output by the accelerator pedal opening sensor 16).

Next, in step S2, the ECU 14 determines whether or not the minus operation on the paddle switch 22 or the shifter 24 has been performed. In the present embodiment, when an operation of pulling the left-side paddle switch 22, as seen from the driver seat side, toward the driver has been performed, or when an operation of moving the shift lever 30 positioned in the sub gate 36 toward the rear has been performed, the ECU 14 determines that the minus operation has been performed.

As a result of the determination in step S2, when the minus operation on the paddle switch 22 or the shifter 24 has been performed, the process proceeds to step S3, and the ECU 14 determines whether or not it is possible to change the torque control map to the lower output side, namely, whether or not it is possible to change the torque control map so as to decrease the output torque of the motor 2 according to the same accelerator pedal opening, and increase the regenerative torque thereof. In the present embodiment, when the torque control map set at the time of executing the determination in step S3 is D−, D, D+, or D++, it is possible to change the torque control map to the lower output side. On the other hand, when the torque control map is D−−, it is not possible to change the torque control map to the lower output side. As an initial value of the torque control map, for example, D is set.

As a result of the determination in step S3, when it is possible to change the torque control map to the lower output side, the process proceeds to step S4, and the ECU 14 changes the torque control map to the lower output side by one step. Specifically, when the torque control map is D−, the torque control map is changed to D−−, when the torque control map is D, the torque control map is changed to D−, when the torque control map is D+, the torque control map is changed to D, and when the torque control map is D++, the torque control map is changed to D+. Consequently, the output torque of the motor 2 according to the accelerator pedal opening decreases, and the regenerative torque thereof increases.

As a result of the determination in step S3, when it is not possible to change the torque control map to the lower output side, or after step S4, the process proceeds to step S5, and the ECU 14 sets, based on the torque control map set at this time, target motor torque according to the vehicle speed and the accelerator pedal opening acquired in step S1. In the present embodiment, the ECU 14 reads the torque control map set when executing step S5, from the torque control maps D−−, D−, D, D+, D++ to be used for the vehicle speed acquired in step S1. Then, based on the read torque control map, the output torque or regenerative torque of the motor 2 according to the accelerator pedal opening acquired in step S1 is obtained and set as the target motor torque.

As a result of the determination in step S2, when the minus operation on the paddle switch 22 or the shifter 24 has not been performed, the process proceeds to step S6, and the ECU 14 determines whether or not the plus operation on the paddle switch 22 or the shifter 24 has been performed. In the present embodiment, when the operation of pulling the right-side paddle switch 22, as seen from the driver seat side, toward the driver has been performed, or when the operation of moving the shift lever 30 positioned in the sub gate 36 toward the front has been performed, the ECU 14 determines that the plus operation has been performed.

As a result of the determination in step S6, when the plus operation on the paddle switch 22 or the shifter 24 has been performed, the process proceeds to step S7, and the ECU 14 determines whether or not it is possible to change the torque control map to the higher output side, namely whether or not it is possible to change the torque control map so as to increase the output torque of the motor 2 according to the same accelerator pedal opening, and decrease the regenerative torque thereof. In the present embodiment, when the torque control map is D−−, D−, D, or D+, it is possible to change the torque control map to the higher output side. On the other hand, when the torque control map is D++, it is not possible to change the torque control map to the higher output side.

As a result of the determination in step S7, when it is possible to change the torque control map to the higher output side, the process proceeds to step S8, and the ECU 14 changes the torque control map to the higher output side by one step. Specifically, when the torque control map is D−−, the torque control map is changed to D−, when the torque control map is D−, the torque control map is changed to D, when the torque control map is D, the torque control map is changed to D+, and when the torque control map is D+, the torque control map is changed to D++. Consequently, the output torque of the motor 2 according to the accelerator pedal opening increases, and the regenerative torque thereof decreases.

As a result of the determination in step S6, when the plus operation on the paddle switch 22 or the shifter 24 has not been performed, and, as a result of the determination in step S7, when it is not possible to change the torque control map to the higher output side, or after step S8, the process proceeds to step S5, and the ECU 14 sets, based on the torque control map set at this time, target motor torque according to the vehicle speed and the accelerator pedal opening acquired in step S1.

After step S5, the process proceeds to step S9, and the ECU 14 controls, based on the target motor torque set in step S5, the output torque or regenerative torque of the motor 2. For example, the ECU 14 controls the inverter 12 based on the target motor torque set in step S5, and supplies electric power from the battery 10 to the motor 2 or supplies regenerative electric power from the motor 2 to the battery 10 through the inverter 12, thereby realizing the desired output torque or regenerative torque set as the target motor torque.

Thereafter, the ECU 14 repeatedly executes the process from step S1 to S9. Consequently, every time the plus operation on the paddle switch 22 or the shifter 24 is received, the output torque of the motor 2 according to the same accelerator pedal opening increases and the regenerative torque thereof decreases until the torque control map D++. Also, every time the minus operation on the paddle switch 22 or the shifter 24 is received, the output torque of the motor 2 according to the same accelerator pedal opening decreases and the regenerative torque thereof increases until the torque control map D−−.

<Modification>

Next, another embodiment of the present invention will be described. In this another embodiment, the electric automobile 1 does not include the paddle switches 22.

Figure 7:
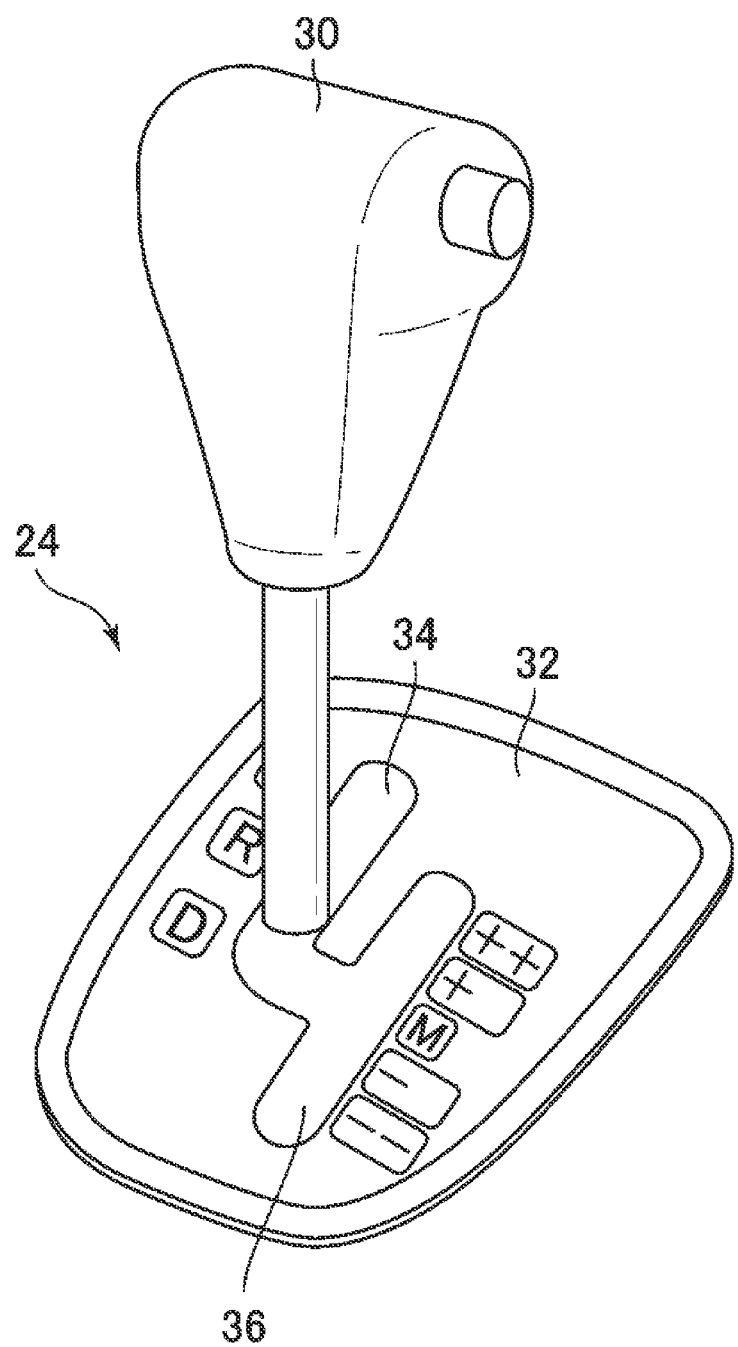
FIG. 7 is a perspective view of a shifter according to another embodiment of the present invention.

First, the shifter 24 according to another embodiment will be described with reference to FIG. 7. FIG. 7 is a perspective view of the shifter 24 according to another embodiment. As shown in FIG. 7, the shifter 24 according to another embodiment basically has the same configuration as the shifter 24 shown in FIG. 4, but is different in the configuration of the sub gate 36. Specifically, the sub gate 36 according to another embodiment is not a returnable gate, and has five ranges ++, +, M, −− arranged in series from the front toward the rear. The sub gate 36 is connected, at the M range position, to the D range position of the main gate 34.

Similarly to the main gate 34, each shift position of the sub gate 36 is provided with a shift position sensor for detecting the position of the shift lever 30, and it is possible to detect in which of the ranges ++, +, M, −−, the shift lever 30 is positioned. When the shift lever 30 is operated, these sensors output operation signals according to the position of the shift lever 30 to the ECU 14.

Thus, in another embodiment, the shift lever 30 is capable of receiving different operating strokes. For example, it is possible to lower the shift lever 30 by one step from the ++ range to the + range, or by three steps from the ++ range to the − range. Similarly, it is also possible to raise the shift lever 30 by one step from the − range to the M range, or by four steps from the −− range to the ++ range.

Figure 8:
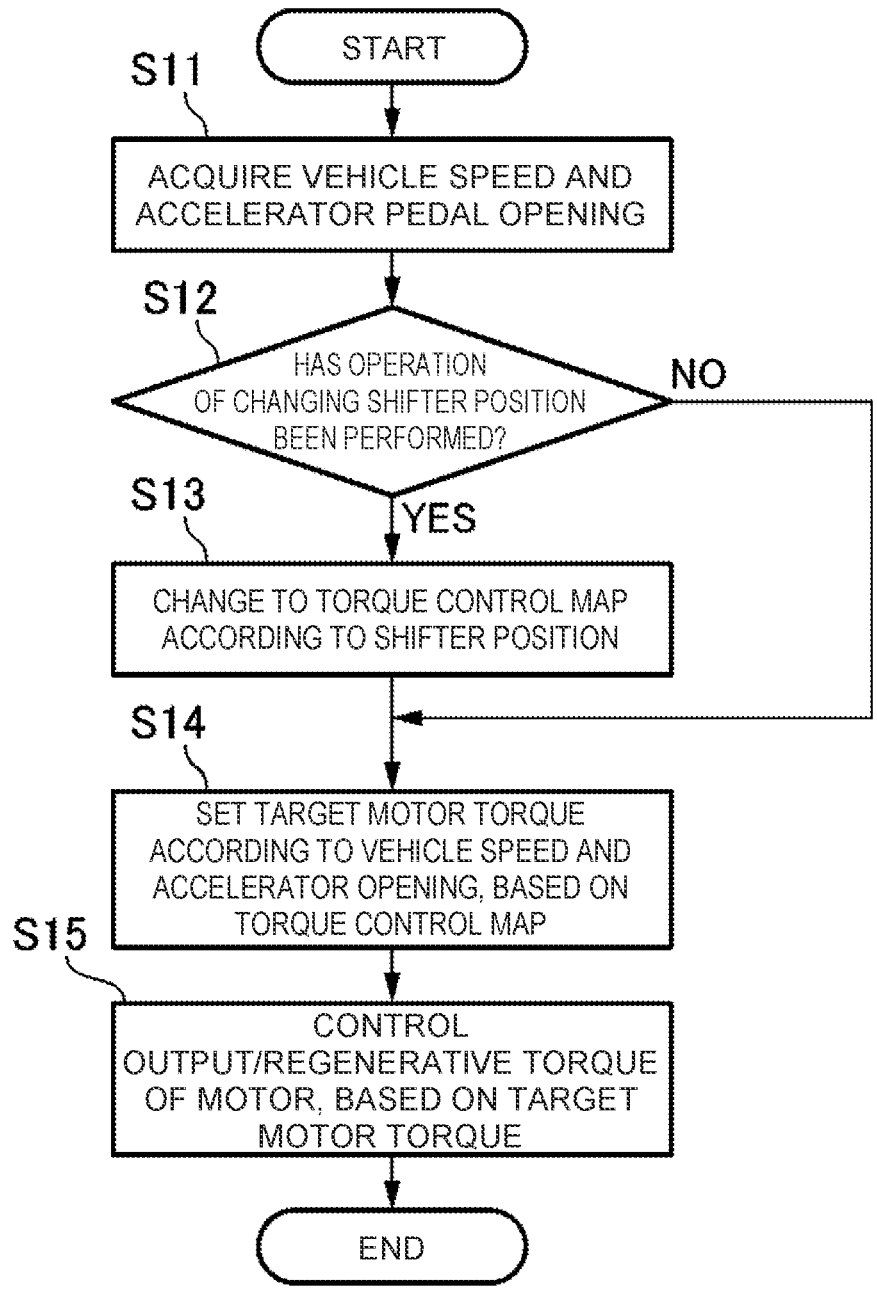
FIG. 8 is a flowchart showing a motor torque control process according to another embodiment of the present invention.

Next, a motor torque control process according to another embodiment will be described with reference to FIG. 8. FIG. 8 is a flowchart showing the motor torque control process according to another embodiment. This flow is started by the ECU 14 upon turning on the power source of the electric automobile 1, and is repeatedly executed at a predetermined cycle.

First, in step S11, the ECU 14 acquires the vehicle speed detected by the vehicle speed sensor 18, and the accelerator pedal opening detected by an accelerator opening sensor.

Next, in step S12, the ECU 14 determines whether or not an operation of changing the position of the shifter 24 has been performed. In another embodiment, when an operation of changing the range of the shift lever 30 positioned in the sub gate 36 has been performed, the ECU 14 determines that the operation of changing the position of the shifter 24 has been performed.

As a result of the determination in step S12, when the operation of changing the position of the shifter 24 has been performed, the process proceeds to step S13, and the ECU 14 changes the torque control map to a torque control map according to the position of the shifter 24 after being changed. Specifically, the torque control map is changed to D−− when the range of the shift lever 30 has been changed to the −− range, the torque control map is changed to D− when the range of the shift lever 30 has been changed to the − range, the torque control map is changed to D when the range of the shift lever 30 has been changed to the M range, the torque control map is changed to D+ when the range of the shift lever 30 has been changed to the +range, and the torque control map is changed to D++ when the range of the shift lever 30 has been changed to the ++ range.

As a result of the determination in step S12, when the operation of changing the position of the shifter 24 has not been performed, or after step S13, the process proceeds to step S14, and the ECU 14 sets, based on the torque control map set at this time, target motor torque according to the vehicle speed and the accelerator pedal opening acquired in step S11. In this another embodiment, the ECU 14 reads the torque control map set at the time of executing step S14, from the torque control maps D−−, D−, D, D+, D++ to be used for the vehicle speed acquired in step S11. Then, based on the read torque control map, the output torque or regenerative torque of the motor 2 according to the accelerator pedal opening acquired in step S11 is obtained and set as the target motor torque.

After step S14, the process proceeds to step S15, and the ECU 14 controls the output torque or regenerative torque of the motor 2, based on the target motor torque set in step S14.

Thereafter, the ECU 14 repeatedly executes the process from step S11 to S15. Consequently, as the operating stroke of the shifter 24 increases, that is, as the number of steps to be changed when changing the range of the shift lever 30 positioned in the sub gate 36 increases, the amount of change in the output torque and regenerative torque of the motor 2 according to the same accelerator pedal opening increases. For example, the amount of decrease in the output torque of the motor 2 according to the same accelerator pedal opening and the amount of increase in the regenerative torque thereof when the shift lever 30 has been lowered by three steps from the ++ range to the − range are larger than the amount of decrease in the output torque of the motor 2 according to the same accelerator pedal opening and the amount of increase in the regenerative torque thereof when the shift lever 30 has been lowered by one step from the ++ range to the + range.

<Operation and Effect>

Next, the operation and effect of the powertrain systems for electric automobiles according to the above-described embodiment and another embodiment will be described.

First, the ECU 14 controls, based on the torque control maps defining the relationship between the accelerator pedal opening and the output torque of the motor 2 in advance, the output torque of the motor 2 according to the accelerator pedal opening, and changes, based on an operation on the paddle switch 22 or the shifter 24, the torque control map to be used for controlling the output torque of the motor 2.

Therefore, even in the electric automobile 1 in which the reduction ratio between the motor 2 and the drive wheels 8 is fixed, the torque to be output from the motor 2 can be changed, without adjusting the accelerator pedal opening, by the driver by operating the paddle switch 22 or the shifter 24 and changing the torque control map. This makes it possible to output desired torque from the motor 2 with an angle of the accelerator pedal that is easy for the driver to operate, regardless of traveling environments such as the road surface gradient and the wind direction.

Since the paddle switches 22 are mounted on the steering wheel 20 of the electric automobile 1, the driver can easily perform the operation for changing the torque control map while traveling.

The ECU 14 controls, based on the torque control maps defining the relationship between the accelerator pedal opening and the regenerative torque of the motor 2 in advance, the regenerative torque of the motor 2 according to the accelerator pedal opening, and changes, based on the operation on the paddle switch 22 or the shifter 24, the torque control map to be used for controlling the regenerative torque of the motor 2.

Therefore, even in the electric automobile 1 in which the reduction ratio between the motor 2 and the drive wheels 8 is fixed, the regenerative torque of the motor 2 can be changed, without adjusting the accelerator pedal opening, by the driver by operating the paddle switch 22 or the shifter 24 and changing the torque control map. This makes it possible to generate desired regenerative torque by the motor 2 with an angle of the accelerator pedal that is easy for the driver to operate, regardless of traveling environments such as the road surface gradient and the wind direction.

In the above-described embodiment, the torque control map to be used for controlling the output torque of the motor 2 is set such that the output torque of the motor 2 according to the same accelerator pedal opening increases every time the plus operation on the paddle switch 22 or the shifter 24 is received, and that the output torque of the motor 2 according to the same accelerator pedal opening decreases every time the minus operation on the paddle switch 22 or the shifter 24 is received.

Thus, it is possible to change the torque control map stepwise by the driver by repeatedly operating the paddle switch 22 or the shifter 24. This makes it possible to change stepwise the torque to be output from the motor 2, without adjusting the accelerator pedal opening, and to output desired torque from the motor 2 with an angle of the accelerator pedal that is easier for the driver to operate.

In the above-described another embodiment, the torque control map to be used for controlling the output torque of the motor 2 is set such that the output torque of the motor 2 according to the same accelerator pedal opening increases or decreases with an increase in the operating stroke of the shifter 24.

Thus, the torque control map can be changed stepwise according to the stroke of operating the shifter 24 by the driver. This makes it possible to change stepwise the torque to be output from the motor 2, without adjusting the accelerator pedal opening, and to output desired torque from the motor 2 with an angle of the accelerator pedal that is easier for the driver to operate.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

REFERENCE CHARACTERS LIST

1 Electric automobile
2 Motor
4 Speed reducer
6 Drive shaft
8 Drive wheel
14 ECU
16 Accelerator pedal opening sensor
20 Steering wheel
22 Paddle switch
24 Shifter
26 Processor
28 Memory

The invention claimed is:

1. A powertrain system for an electric automobile, comprising:
   a motor;
   a motive power transmission mechanism that transmits an output torque of the motor to a drive wheel with a single reduction ratio;
   an accelerator pedal opening sensor that detects an accelerator pedal opening;
   a controller electrically connected directly or indirectly to the motor and the accelerator pedal opening sensor; and
   an operation switch that is mounted in such a location as to be operable by a driver while driving, and is electrically connected directly or indirectly to the controller, wherein
   the controller includes:
       memory for storing a program; and
       a processor for executing the program,
   the processor is configured to:
       control, based on a torque control map defining a relationship between the accelerator pedal opening and the output torque of the motor and defining a relationship between the accelerator pedal opening and regenerative torque of the motor in advance, the output torque of the motor according to the accelerator pedal opening and the regenerative torque of the motor according to the accelerator pedal opening; and
       change, based on an operation on the operation switch, the torque control map to be used for controlling the output torque of the motor and for controlling the regenerative torque of the motor, wherein
   the operation switch is configured to receive a first operation and a second operation, the first operation changing the torque control map to a lower output side, and the second operation changing the torque control map to a higher output side,
   according to the torque control map, at a first accelerator pedal opening degree, the regenerative torque increases as the first operation is performed by the operation switch, and
   according to the torque control map, at a second accelerator pedal opening degree larger than the first accelerator pedal opening degree, the output torque increases as the second operation is performed by the operation switch.

2. The powertrain system for an electric automobile according to claim 1, wherein the operation switch is mounted on a steering wheel of the electric automobile.

3. The powertrain system for an electric automobile according to claim 1, wherein
   the operation switch is configured to be capable of repeatedly receiving the first operation and the second operation, and
   the torque control map to be used for controlling the output torque of the motor is set such that:
       the output torque of the motor according to the same accelerator pedal opening decreases every time the first operation on the operation switch is received, and
       the output torque of the motor according to the same accelerator pedal opening increases every time the second operation on the operation switch is received.

4. The powertrain system for an electric automobile according to claim 1, wherein
   the operation switch is configured to be capable of receiving different operating strokes, and
   the torque control map to be used for controlling the output torque of the motor is set such that the output torque of the motor according to the same accelerator pedal opening increases or decreases with an increase in operating stroke of the operation switch.

5. The powertrain system for an electric automobile according to claim 2, wherein
   the operation switch is configured to be capable of repeatedly receiving the first operation and the second operation, and
   the torque control map to be used for controlling the output torque of the motor is set such that:
       the output torque of the motor according to the same accelerator pedal opening decreases every time the first operation on the operation switch is received, and
       the output torque of the motor according to the same accelerator pedal opening increases every time the second operation on the operation switch is received.

6. The powertrain system for an electric automobile according to claim 2, wherein
   the operation switch is configured to be capable of receiving different operating strokes, and
   the torque control map to be used for controlling the output torque of the motor is set such that the output torque of the motor according to the same accelerator pedal opening increases or decreases with an increase in operating stroke of the operation switch.

7. The powertrain system for an electric automobile according to claim 1, wherein
   the operation switch comprises a pair of paddle switches which are mounted on a back side of a steering wheel of the electric automobile, and
   each of the pair of paddle switches is configured to:
       allow the driver to pull the paddle switch toward the driver from a standard position while the driver has hands on the steering wheel, and
       return to the standard position when the driver releases the paddle switch.

8. The powertrain system for an electric automobile according to claim 1, wherein the operation switch is a shifter that includes a shift lever that is operated by the driver, and a gate panel for guiding movement of the shift lever, the gate panel is formed by a main gate extending in the front-rear direction of the electric automobile, and a sub gate extending parallel to the main gate, and the sub gate is a returnable gate with the predetermined range as a standard position, and the shift lever returns to the standard position when the driver releases the shift lever after performing an operation of moving the shift lever toward the front, or an operation of moving the shift lever toward the rear.

9. The powertrain system for an electric automobile according to claim 7, wherein the controller determines whether or not a minus operation on one of the pair of paddle switches has been performed, when an operation of pulling a left-side paddle switch of the pair of paddle switches toward the driver has been performed, the controller determines that the minus operation has been performed, and when the minus operation on the paddle switch has been performed, the controller changes the torque control map to the lower output side by one step.

10. The powertrain system for an electric automobile according to claim 8, wherein the controller determines whether or not a minus operation on the shifter has been performed, and when an operation of moving the shift lever positioned in the sub gate toward the rear has been performed, the controller changes the torque control map to the lower output side by one step.

11. The powertrain system for an electric automobile according to claim 1, wherein according to the torque control map, at a third accelerator pedal opening degree larger than the first accelerator pedal opening degree and smaller than the second accelerator pedal opening degree, the regenerative torque decreases and the output torque increases as the second operation is performed by the operation switch.

12. The powertrain system for an electric automobile according to claim 1, wherein the operation switch is configured to be capable of repeatedly receiving the first operation and the second operation, and the torque control map to be used for controlling the regenerative torque of the motor is set such that:

the regenerative torque of the motor according to the same accelerator pedal opening increases when the first operation on the operation switch is received, and the regenerative torque of the motor according to the same accelerator pedal opening decreases when the second operation on the operation switch is received.

* * * * *